(12) United States Patent
Baptist et al.

(10) Patent No.: US 10,372,540 B2
(45) Date of Patent: *Aug. 6, 2019

(54) STANDARD AND NON-STANDARD DISPERSED STORAGE NETWORK DATA ACCESS

(71) Applicant: International Business Machines Corporation, Armonk, NY (US)

(72) Inventors: Andrew D. Baptist, Mt. Pleasant, WI (US); Bart R. Cilfone, Marina del Rey, CA (US); Greg R. Dhuse, Chicago, IL (US); Wesley B. Leggette, Chicago, IL (US); James L. Lester, Chicago, IL (US); Zachary J. Mark, Chicago, IL (US); Manish Motwani, Chicago, IL (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,288

(22) Filed: Oct. 15, 2018

(65) Prior Publication Data

US 2019/0050291 A1 Feb. 14, 2019

Related U.S. Application Data

(63) Continuation of application No. 15/257,001, filed on Sep. 6, 2016, now Pat. No. 10,169,149.

(51) Int. Cl.
*G06F 11/10* (2006.01)
*G06F 3/06* (2006.01)
*G06F 11/00* (2006.01)

(52) U.S. Cl.
CPC ......... *G06F 11/1076* (2013.01); *G06F 3/064* (2013.01); *G06F 3/067* (2013.01); *G06F 3/0619* (2013.01)

(58) Field of Classification Search
None
See application file for complete search history.

(56) References Cited

U.S. PATENT DOCUMENTS 4,092,732 A 5/1978 Ouchi
5,454,101 A 9/1995 Mackay et al.
(Continued)

FOREIGN PATENT DOCUMENTS

CN 102986190 A 3/2013

OTHER PUBLICATIONS

Chung; An Automatic Data Segmentation Method for 3D Measured Data Points; National Taiwan University; pp. 1-8; 1998.
(Continued)

*Primary Examiner* — Justin R Knapp
(74) *Attorney, Agent, or Firm* — Garlick & Markison; Timothy W. Markison; Timothy D. Taylor

(57) ABSTRACT

A method includes receiving, by a computing device of a dispersed storage network (DSN), a non-standard data access request regarding a set of encoded data slices, where the non-standard data access request includes a set of network identifiers of a set of storage units, a data identifier corresponding to data, and a data access function. The method further includes the computing device converting the non-standard data access request into one or more DSN slice names. The method further includes the computing device determining that the one or more DSN slice names are within a slice name range allocated to the computing device. When the one or more DSN slice names are within the slice name range, the method further includes the com-
(Continued)

puting device executing the data access function regarding one or more encoded data slices corresponding to the one or more DSN slice names.

15 Claims, 10 Drawing Sheets

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,756,338 | B1 | 6/2014 | Potakamuri |
| 9,865,329 | B2 * | 1/2018 | Shaeffer ............... G11C 5/025 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0265143 | A1 | 10/2011 | Grube et al. |
| 2015/0067100 | A1 | 3/2015 | Peake et al. |
| 2015/0347589 | A1 | 12/2015 | Fontebride et al. |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

International Searching Authority; International Search Report and Written Opinion; International Application No. PCT/IB2017/055309; dated Dec. 25, 2017; 10 pgs.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

\* cited by examiner distributed, or dispersed, storage network (DSN) 10

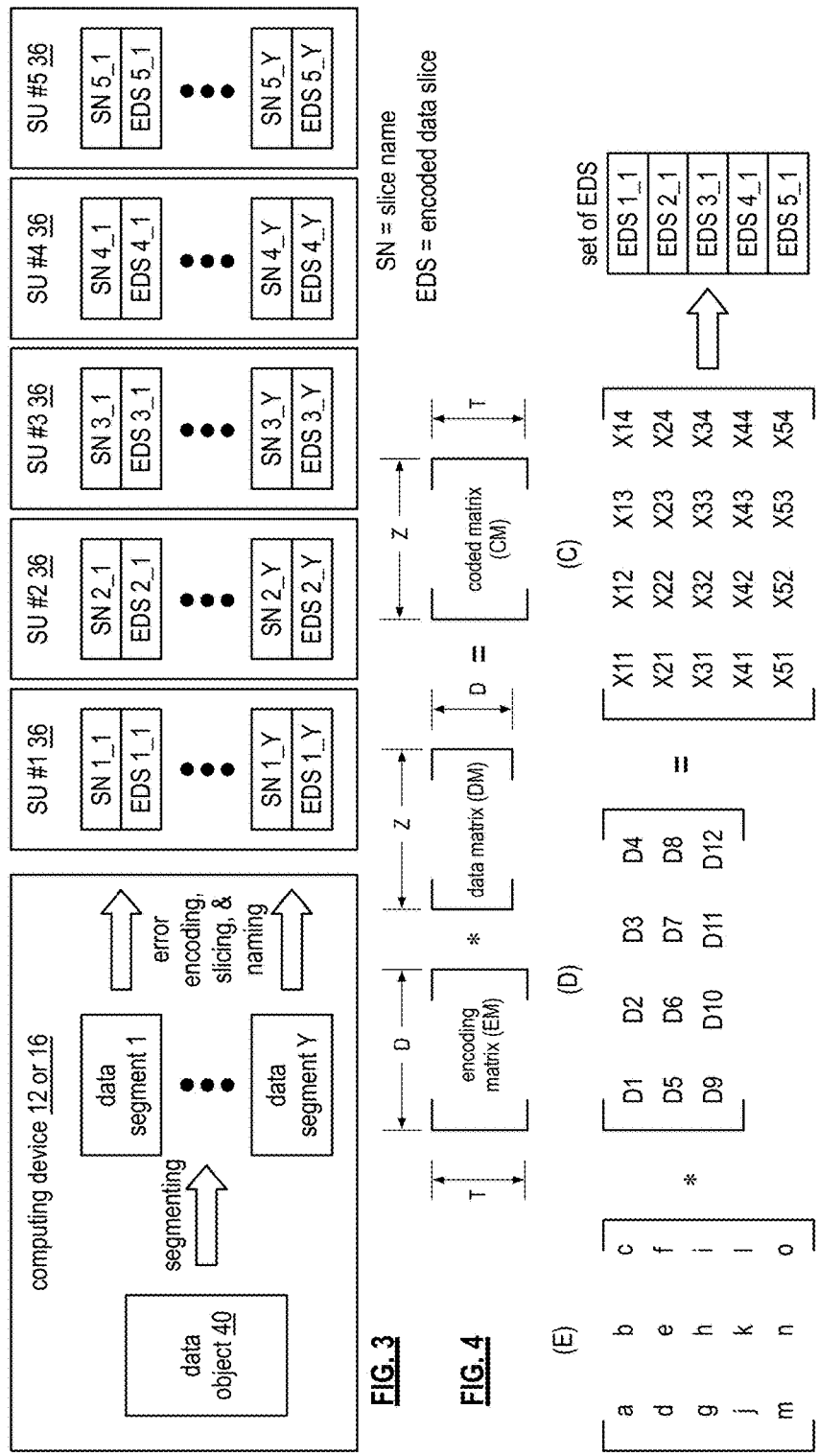

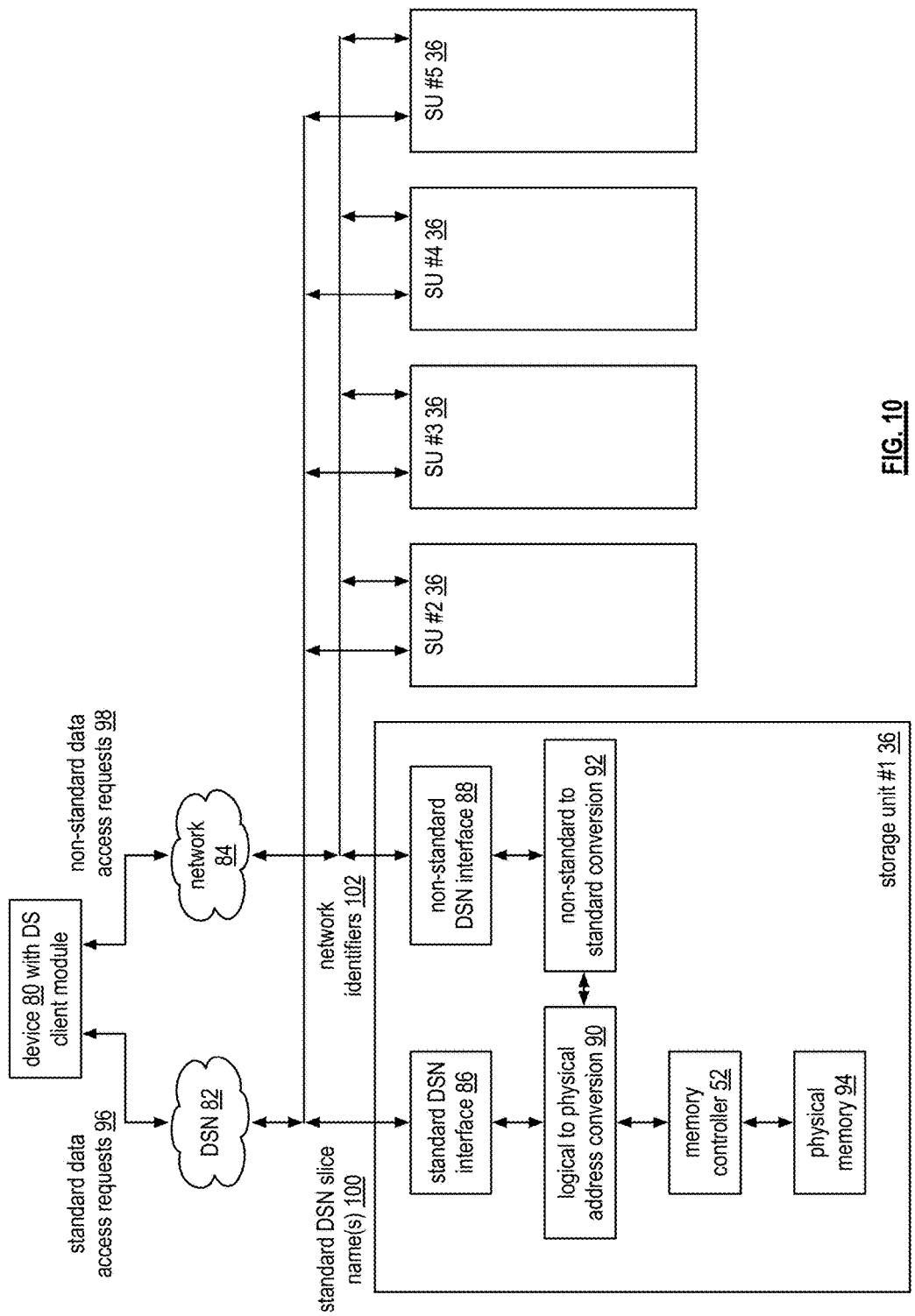

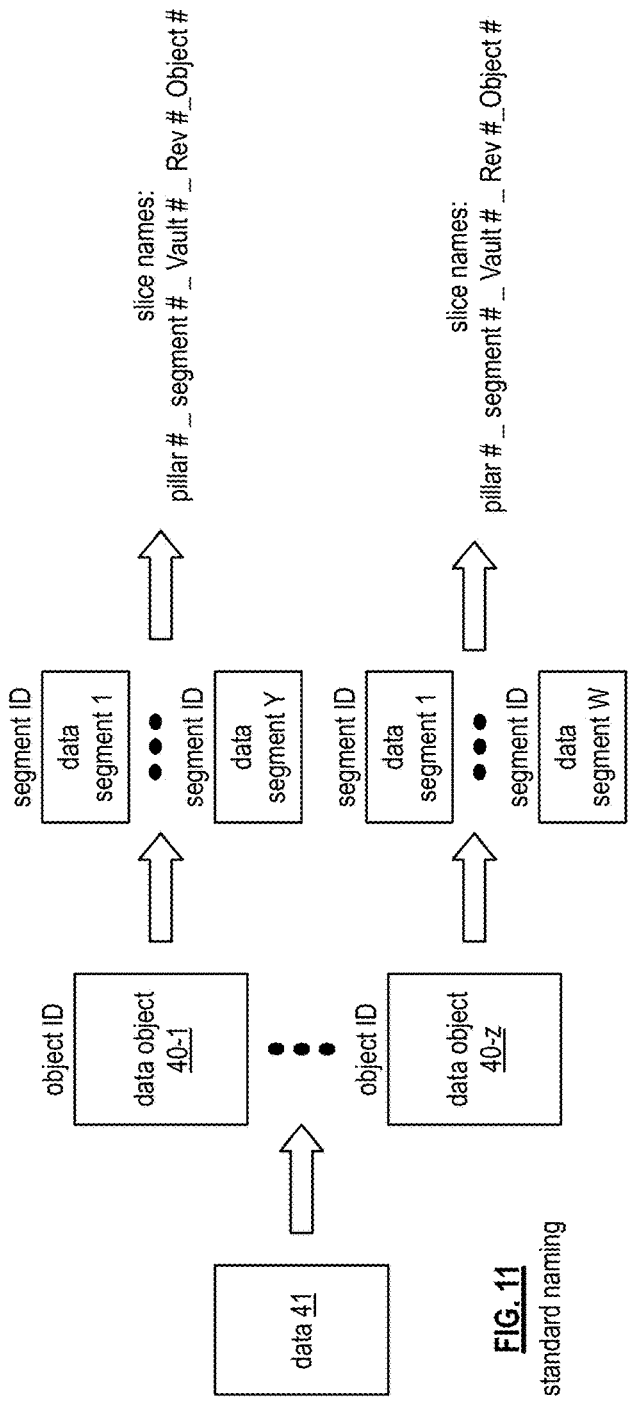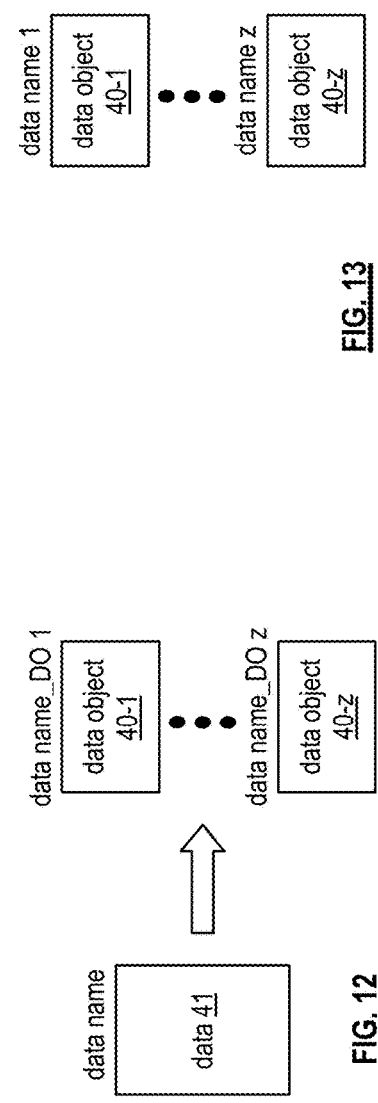
FIG. 11 standard naming
FIG. 12 non-standard naming
FIG. 13 non-standard naming

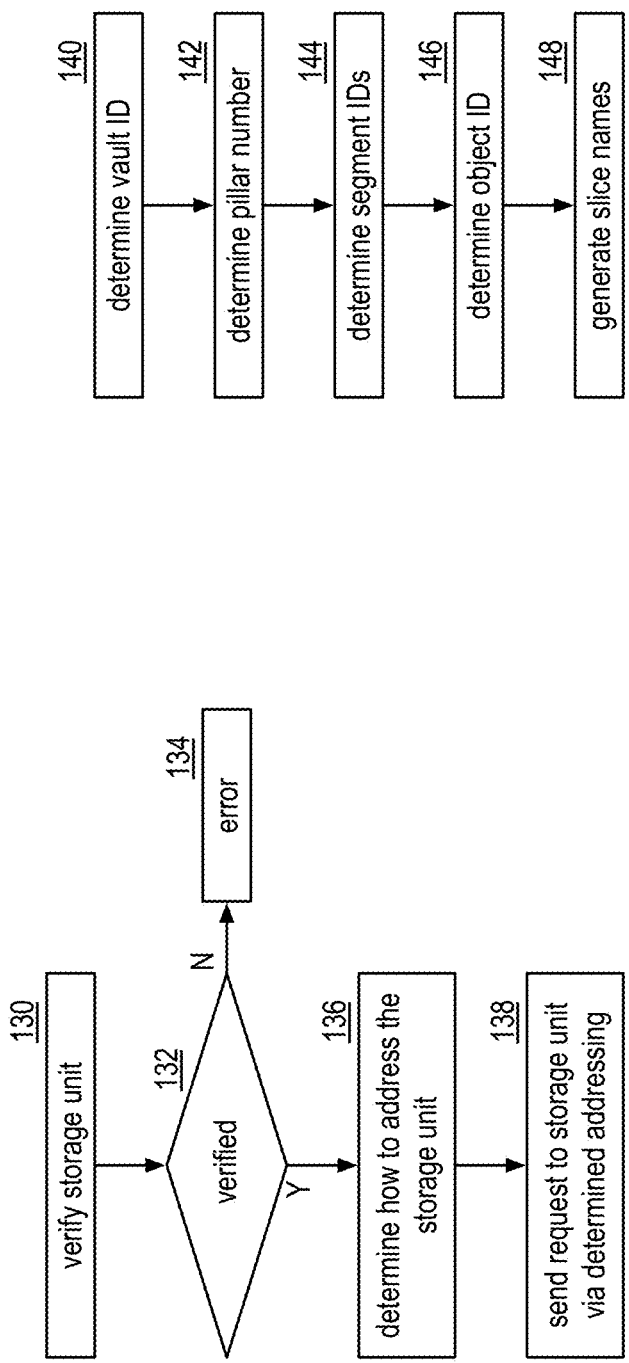

STANDARD AND NON-STANDARD DISPERSED STORAGE NETWORK DATA ACCESS

CROSS REFERENCE TO RELATED PATENTS

The present U.S. Utility patent application claims priority pursuant to 35 U.S.C. § 120 as a continuation of U.S. Utility application Ser. No. 15/257,001, entitled "STANDARD AND NON-STANDARD DISPERSED STORAGE NETWORK DATA ACCESS", filed Sep. 6, 2016, which is hereby incorporated herein by reference in its entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

In a cloud storage system there is a conventional protocol for accessing data (e.g., reading, writing, deleting, etc.). For example, a read request includes individual read requests to each storage unit of the dispersed or distributed storage network (DSN) storing one or more pieces of the desired data. If additional data is desired to be read, another read request needs to be generated and sent to the storage units. This occurs even if the data and the additional data are related.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 10 is a schematic block diagram of another embodiment of a DSN in accordance with the present invention;

FIG. 11 is a diagram of an example of standard encoded data slice naming in accordance with the present invention;

FIG. 12 is a diagram of an example of non-standard data naming in accordance with the present invention;

FIG. 13 is a diagram of another example of non-standard data naming in accordance with the present invention;

FIG. 16 is a logic diagram of an example of a sending step of a method of standard and non-standard data accessing in a DSN in accordance with the present invention; and FIG. 17 is a logic diagram of an example of a converting step of a method of standard and non-standard data accessing in a DSN in accordance with the present invention.

DETAILED DESCRIPTION OF THE INVENTION

Figure 1:
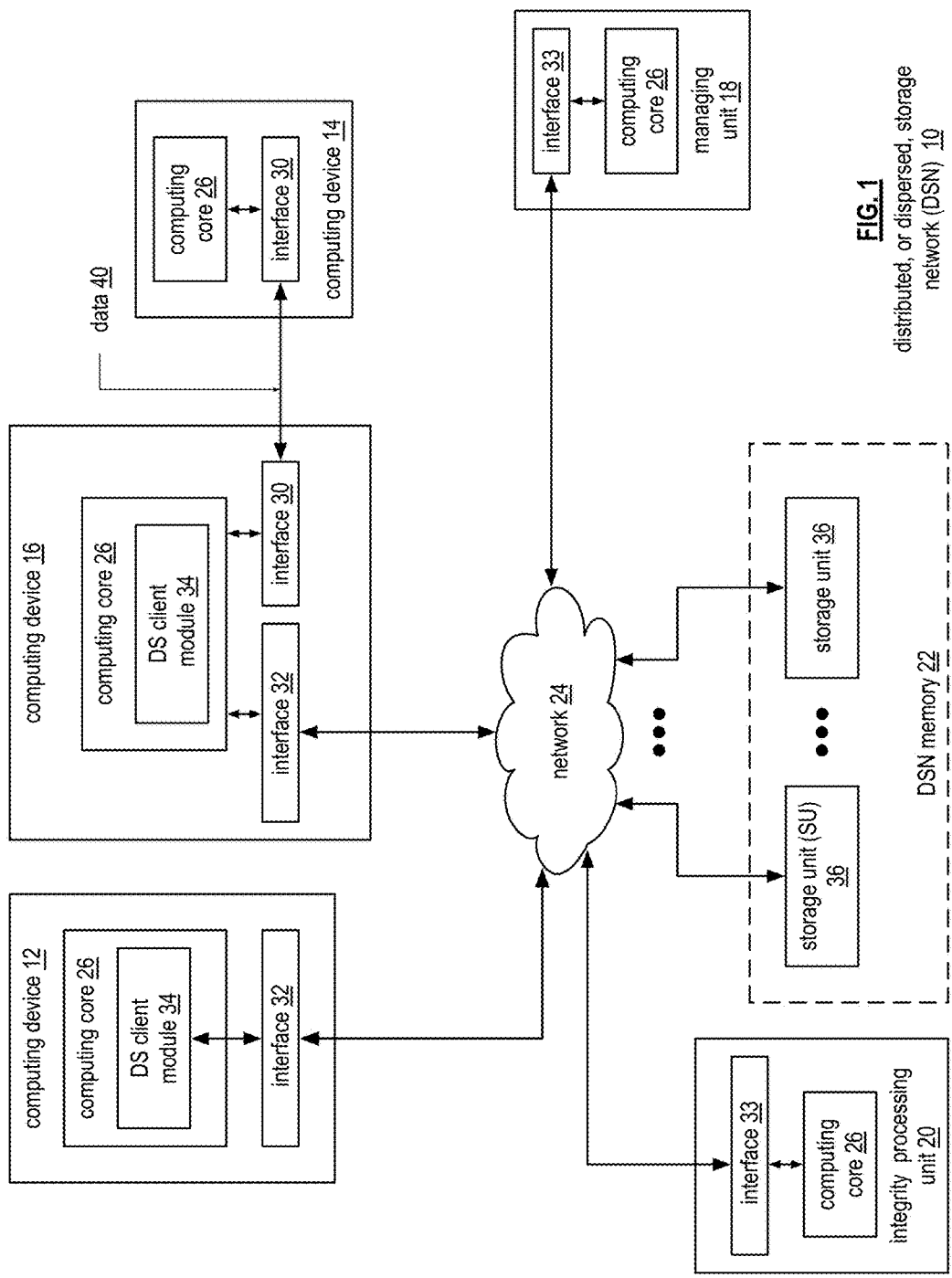
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
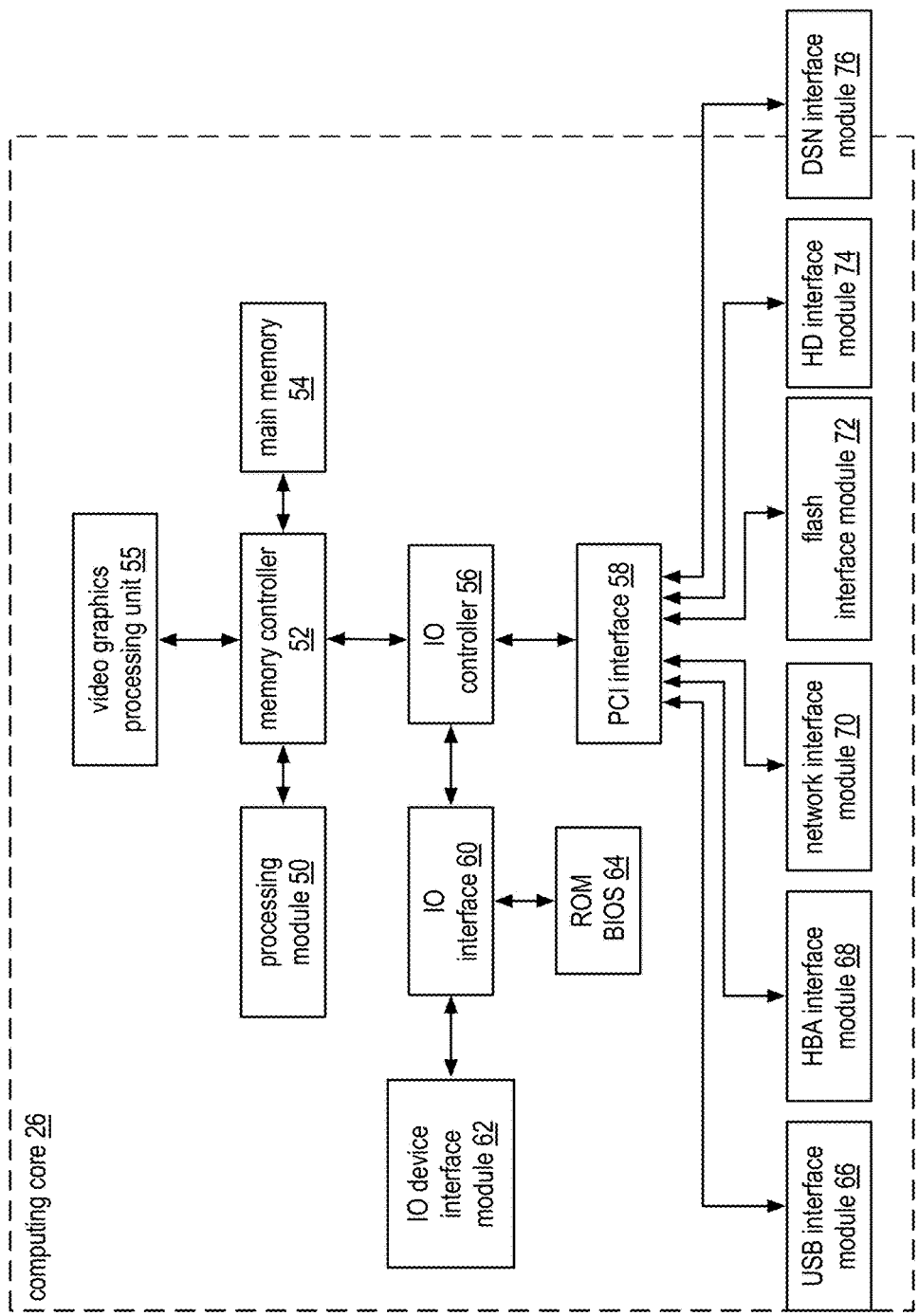
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
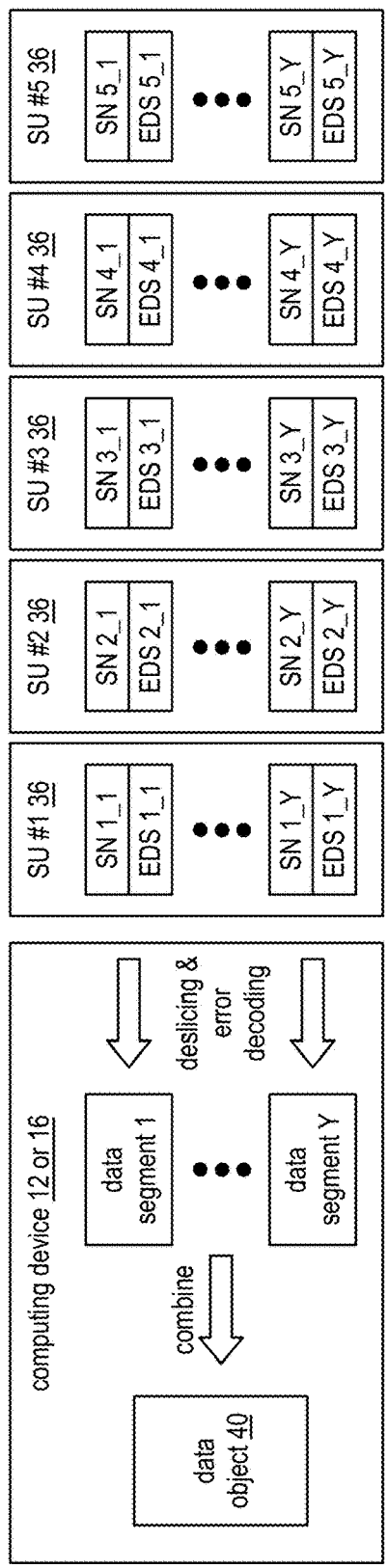
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
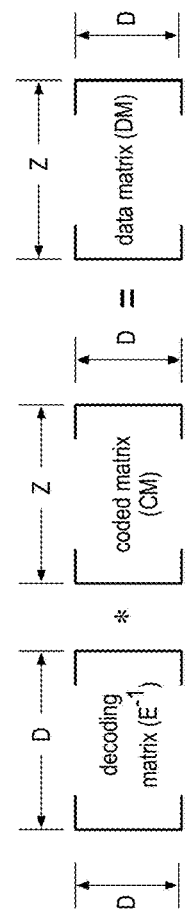
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
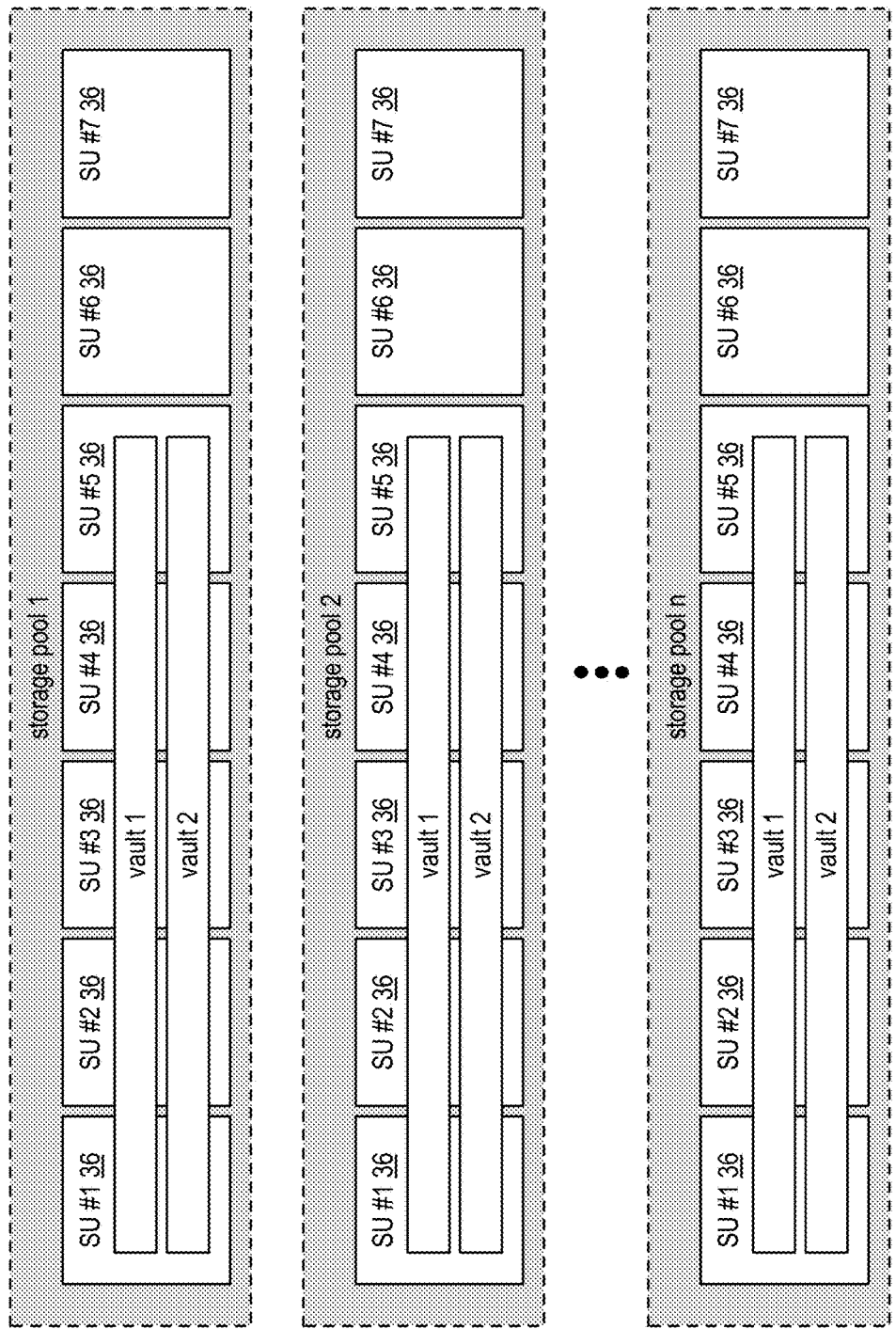
FIG. 9 is a schematic block diagram of an embodiment of a plurality of pools of storage units in accordance with the present invention.

FIG. 9 is a schematic block diagram of an embodiment of a plurality of pools of storage units. In this example, storage units 36 are arranged into a plurality of storage pools (e.g., 1-n). Further, each storage pool includes seven storage units for ease of illustration. A storage pool, however, can have many more storage units than seven and, from storage pool to storage pool, may have different numbers of storage units.

The storage pools 1-n support two vaults (vault 1 and vault 2) using only five of the seven of storage units. The number of storage units within a storage pool supporting a vault corresponds to the pillar width number, which is five in this example. Note that a storage pool may have rows of storage units, where SU #1 represents a plurality of storage units, each corresponding to a first pillar number; SU #2 represents a second plurality of storage units, each corresponding to a second pillar number; and so on. Note that other vaults may use more or less than a pillar width number of five storage units. Further note that the managing unit, or other authority computing device, issues configuration information that defines the storage pools' composition of storage units, DSN address ranges, and/or communication protocols with the storage units.

FIG. 10 is a schematic block diagram of another embodiment of a DSN that includes a device 80, a DSN network 82, another network 84, and a plurality of storage units 36 (5 shown). The device 80 includes a DS client module 34 and may be a computing device 12 (e.g., one that does its own DSN encoding and decoding), a computing device 16 (e.g., on that does DSN encoding and decoding for other computing devices), a managing unit 18, and/or an integrity processing unit 20. The DSN network 82 includes the network 24 of FIG. 1 and the other network 84 includes a LAN, a WAN, and/or a combination thereof. Note that the DSN network 82 and the other network 84 may be mutually exclusive networks or may be comprised of substantially the same infrastructure.

Each of the storage units 36 includes a standard DSN interface 86, a non-standard DSN interface 88, a logical to physical address conversion module 90, a non-standard to standard conversion module 92, a memory controller 52 within the computing core 26, and physical memory 94. The physical memory 94 includes one or more of hard drive memory, tape memory, DSN memory, flash memory, and thumb drive memory. The physical memory 94 stores encoded data slices in accordance with a standard DSN data accessing protocol (e.g., a conventional approach, a standardized approach, a de facto standardized approach, and/or a proprietary approach).

In an example of operation, the device 80 determines whether to issue a data request regarding data using the standard DSN data accessing protocol or a non-standard DSN data accessing protocol (e.g., not the standard DSN data accessing protocol). For example, the standard DSN data accessing protocol corresponds to the DSN operations discussed with reference to one or more of FIGS. 1-9. Thus, for this example, the non-standard DSN data accessing protocol is some other manner of accessing data in the DSN memory 22 (i.e., the storage units 36).

The device 80 determines whether the standard or non-standard DSN data accessing protocol based on one or more factors. For example, the device determines to utilize the non-standard DSN data accessing protocol when the data includes a plurality of related data objects. As a specific example, the related data objects are chapters of a book, from the same author, regarding the same subject matter, etc. Another factor in determining to use the non-standard DSN data accessing protocol is that, for related data, less data access requests need to be generated, sent, and processed.

As another example, the device determines to utilize the non-standard DSN data accessing protocol when the data includes different revision levels of a data object. As a specific example, a data object has been modified one or more times. For each modification, the data object is dispersed storage error encoded to produce a plurality of sets of encoded data slices. The encoded data slices of each of the plurality of sets of encoded data slices has a revision level corresponding to the level of modification. Thus, the non-standard DSN data accessing protocol is used when multiple revision levels of the same data are desired to be accessed.

As yet another example, the device determines to utilize the standard DSN data accessing protocol when the data includes a specific set of encoded data slices. For example, the specific set of encoded data slices is affiliated with multiple other sets of encoded data slices that are tied together with a data name created in accordance with the non-standard DSN data accessing protocol. As a further example, the device determines to utilize the non-standard DSN data accessing protocol or the standard DSN data accessing protocol based on the data access function. As a specific example, the device determines to use the standard DSN data accessing protocol for write requests and to use the non-standard DSN data accessing protocol for read requests or list requests (e.g., return a list of slices names corresponding to encoded data slices stored, wherein the slice names are within a range of slice names).

When the device determines to use the non-standard DSN data accessing protocol, it generates a set of non-standard data access requests 98 regarding the data. For example, a non-standard data access request includes a network identifier 102 of a storage unit, a data identifier corresponding to the data, and a data access function. This will be discussed in greater detail with reference to FIG. 16. The device then sends the set of non-standard data access requests to at least some of the storage units.

A storage unit (e.g., storage unit 1) receives, based on the network identifier identifying the first storage unit, a corresponding one of the non-standard data access requests via the non-standard DSN interface 88. Note that the non-standard DSN interface 88 includes physical connectors (e.g., a network port) and one or more interface protocol applications. For example, an interface protocol application is an application program interface (API), and/or a LAN signal protocol driver, a WAN signal protocol driver.

The interface 88 forwards the non-standard data access request to the non-standard to standard conversion module 92, which converts the non-standard data access request into one or more DSN slice names (e.g., provides a name translation function). The storage unit then determines whether the one or more DSN slice names are within a slice name range allocated to the storage unit. If not, the storage unit reports and error or just ignores the request. If the slice names are within the range, then the slices names are provided to the logical to physical address conversion module 90 to determine where the corresponding encoded data slices of the data are physically stored. Next, the storage unit executes the data access function (e.g., read, write, modify, delete, list) regarding the corresponding encoded data slices.

When the computing device determines to use the standard DSN data accessing protocol, it generates a set of data access requests 96 regarding the data as previously described with reference to one or more of FIGS. 1-9. The device then sends, based on the slice names 100, the requests to the storage units. Within storage unit 1, it receives the corresponding request and slice names. The logical to physical address conversion module 90 converts the slice names into physical addresses to determine where the corresponding encoded data slices are stored. Next, the storage unit executes the data access function (e.g., read, write, modify, delete, list) regarding the corresponding encoded data slices.

FIG. 11 is a diagram of an example of standard encoded data slice naming. In this example, data 41 (e.g., a book, a video, a photo library, etc.) is divided into data objects 40-1 through 40-z. Each of the data objects is assigned an object ID (e.g., randomly generated) and is divided into data segments. Each data segment is assigned a segment ID and is dispersed storage error encoded to produce a set of encoded data slices. Each encoded data slice has a slice name that includes a pillar number, a segment ID (or number), a vault ID, a revision number, and an object ID. To retrieve the data 41, the device generates and issues separate read request for each data object related to the data 41.

FIG. 12 is a diagram of an example of non-standard data naming. In this example, data 41 is again divided into the data objects 40-1 through 40-z. The data 41 is assigned a data name (e.g., book 1, video 1, photo library 1) and each data object is assigned a related name (e.g., book 1_chapter 1, video 1_chapter 1, library 1_chapter 1, etc.). To retrieve the data 41, the device generates and issues a single read request for the data 41.

FIG. 13 is a diagram of another example of non-standard data naming. In this example, related data objects are given related data names. For example, data object 40-1 is given the name chapter 1 of book 1 and data object 40-z is given the name chapter z of book 1. Using one of the data object names, the device can retrieval all of, or at least some of, the data objects that have a related name. Note that the device and the storage units keep a mapping of standard DSN object IDs to non-standard DSN data object names to facilitate the conversion.

Figure 14:
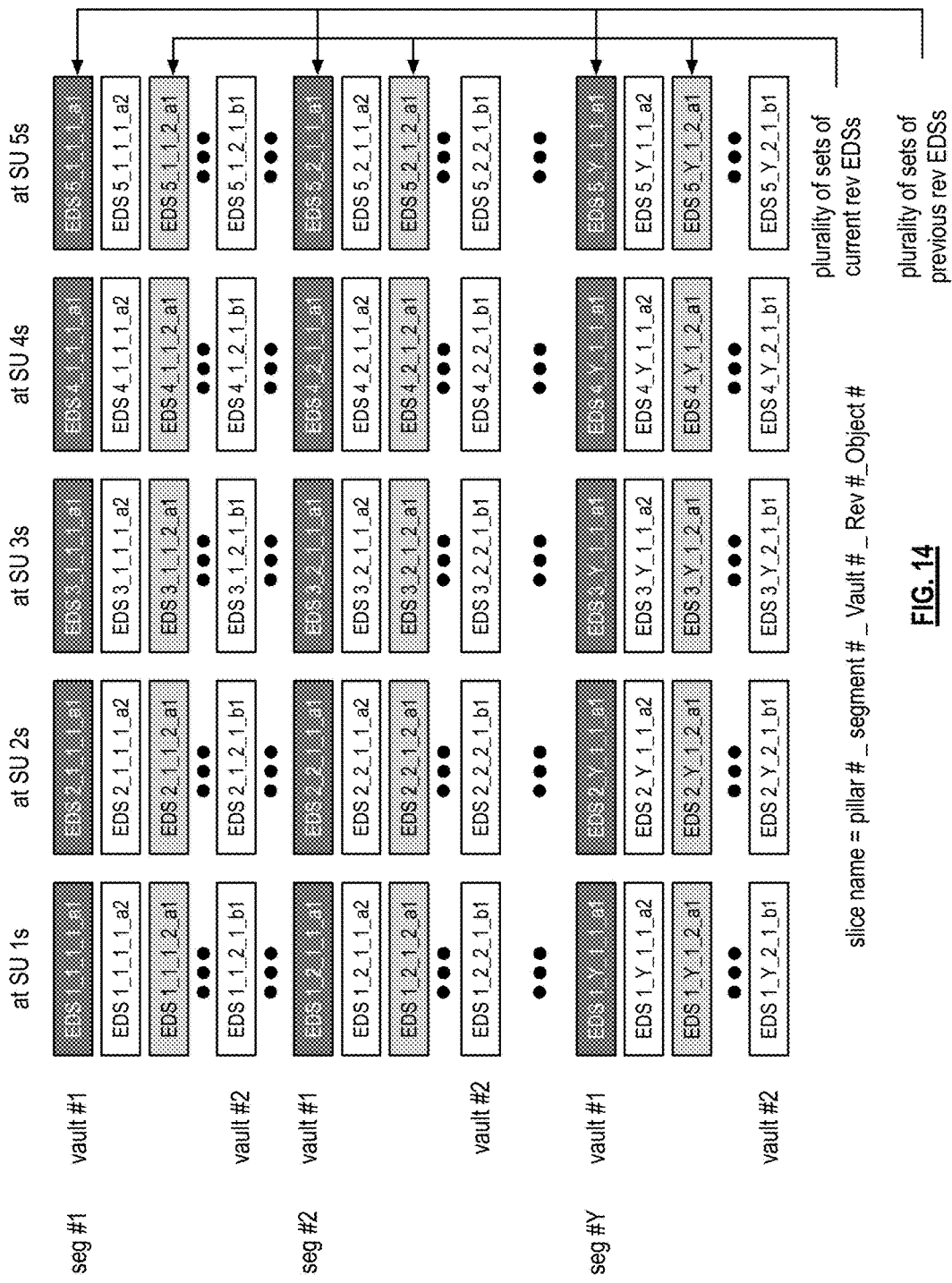
FIG. 14 is a schematic block diagram of an example of accessing encoded data slices in a DSN in accordance with the present invention.

FIG. 14 is a schematic block diagram of an example of accessing encoded data slices in a DSN. Each column of encoded data slices (EDSs) corresponds to a pillar number of a pillar width number of an encoding scheme. In this example, the pillar width number is five; where pillar number one EDSs are stored in one or more first storage units (SU 1); pillar number two EDSs are stored in one or more second storage units (SU s); and so on. This example further shows that the storage units support two vaults (vault 1 and 2).

Each encoded data slice (EDS) is stored based on its slice name, which includes, in most significant to least significant order: a pillar number, a segment number, a vault number (which includes vault generation information), a revision number, and an object number. With the pillar number being the most significant portion of the slice name, it allows pillar one EDSs to be stored in the first storage unit(s). Within the first storage unit(s), the EDSs are stored in order by segment number, vault number, revision number, and object number. As such, for a plurality of set of encoded data slices, which corresponds to an encoded data object, pillar one EDSs are not logically stored in a consecutive manner; they are interspersed with pillar one EDSs of other encoded data objects and with different revision levels of the same data object.

As is further shown in this example, three encoded data objects are being stored: data object "a1", data object "a2" and data object "b1". Two revisions of data object "a1" are being stored" revision level "1" (e.g., the plurality of sets of previous rev EDSs) and revision level "2" (e.g., the plurality of sets of current rev EDSs).

In an example, using the standard DSN data accessing protocol to access the two revision levels of encoded data object "a1" requires two plurality of sets of access requests: one for each revision level. Using the non-standard DSN data accessing protocol, however, one access request that identifies data object "a1" will provide access to both revision levels.

As another example, if data objects "a1" and "a2" are related (e.g., chapters of a book), then, using the standard DSN data accessing protocol to access the two encoded data objects requires two plurality of sets of access requests: one for each data object. Using the non-standard DSN data accessing protocol, however, one access request that identifies both data objects "a1" and "a2" will provide access to both data objects. Depending on the manner in which both data objects are identifier, the non-standard DSN access request will access only the most current revision levels of a given data object, a selected revision level of a given data object, or multiple revision levels of a given data object.

Figure 15:
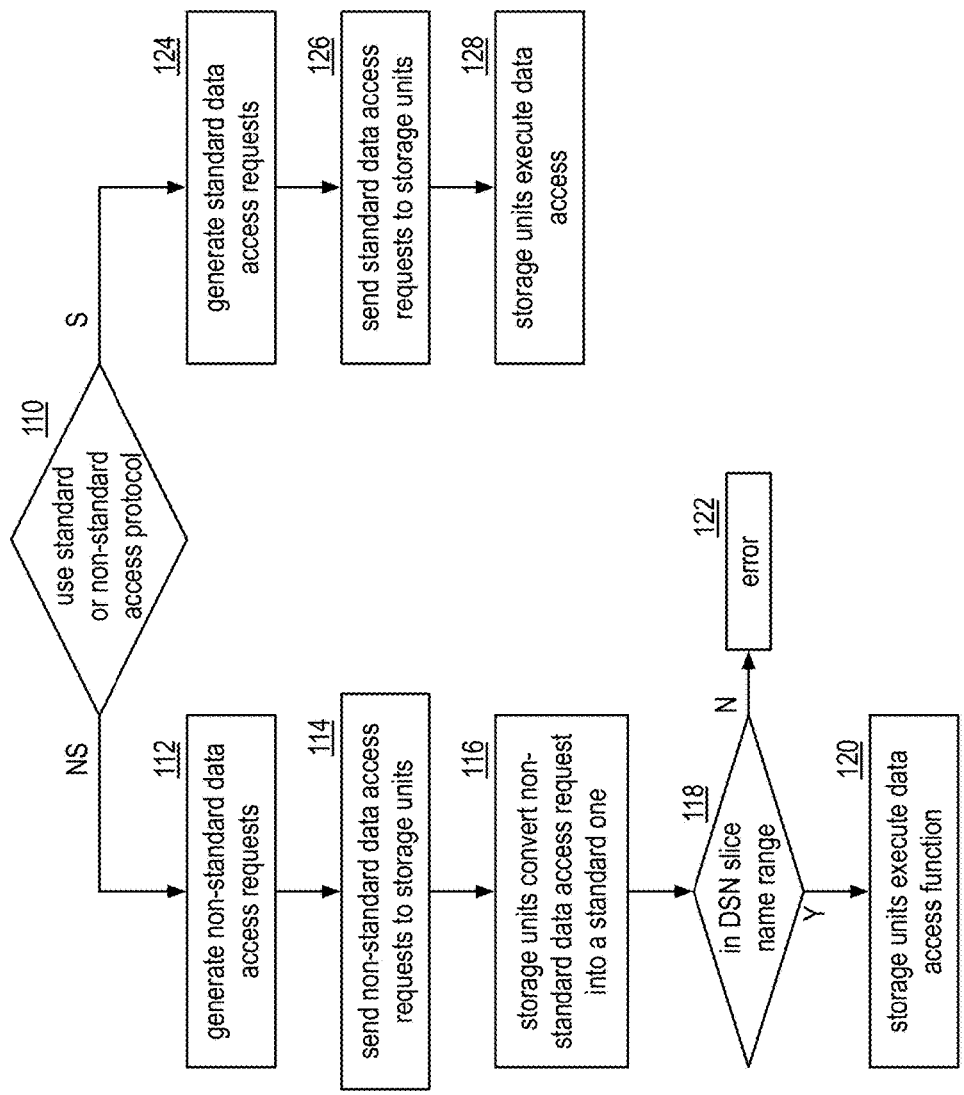
FIG. 15 is a logic diagram of an example of a method of standard and non-standard data accessing in a DSN in accordance with the present invention.

FIG. 15 is a logic diagram of an example of a method of standard and non-standard data accessing in a DSN that includes step 110 where a device (e.g., computing device 12 or 16) determines whether to utilize a non-standard DSN data accessing protocol or a standard DSN data accessing protocol to access data from the DSN. The data (e.g., a data segment, a group of data segments, a data object, a plurality of data objects, etc.) is dispersed storage error encoded into one or more sets of encoded data slices that are stored in a set of storage units of the DSN.

The device may determine to utilize the non-standard DSN data accessing protocol or the standard DSN data accessing protocol in a variety of ways. For example, the device determines to utilize the non-standard DSN data accessing protocol when the data includes a plurality of related data objects. As another example, the device determines to utilize the non-standard DSN data accessing protocol when the data includes different revision levels of a data object. As yet another example, the device determines to utilize the standard DSN data accessing protocol when the data includes a specific set of encoded data slices. As a further example, the device determines to utilize the non-standard DSN data accessing protocol or the standard DSN data accessing protocol based on the data access function (e.g., use the standard protocol for a write function or a delete function, use the non-standard for read function or a list function).

When the device determines to use the non-standard DSN data accessing protocol, the method continues at step 112 where the device generates a set of non-standard data access requests regarding the data. A non-standard data access request includes a network identifier of a storage unit, a data identifier corresponding to the data, and a data access function. In an example, the network identifier includes, for the storage unit, one or more of: a uniform record locator (URL), a network port, a network interface, an application program interface (API), a trusted certificate, an authentication authority, and a credential. In another example, the data identifier includes one or more of: a file name, a name embedded in the URL, one or more data object names, one or more data segment names, a name for the data, a name for a collection of data. In yet another example, the data access function includes one or more of: a read request, a write request, a delete request, and a list request. In a further example, the device generates the data identifier to optimize a particular DSN function, which includes one or more of: locating related encoded data slices, listing related encoded data slices, and listing of translated names regarding encoded data slices. Note that related includes related by topic, related by naming, related by data organization, and/or related by revision number.

The method continues at step 114 where the device sends the set of non-standard data access requests to at least some storage units of the set of storage units, which includes the storage unit. The method continues at step 116 where a storage unit converts the non-standard data access request into one or more DSN slice names. An example will be further discussed with reference to FIG. 17.

The method continues at step 118 where the storage unit determines whether the one or more DSN slice names are within a slice name range allocated to the storage unit. If not, the method continues at step 122 where the storage unit determines that the request is an error and sends an error message or ignores the request. If, however, the one or more DSN slice names are within the slice name range, the method continues at step 120 where the storage unit executes the data access function (e.g., read, write, delete, list, etc.) regarding one or more encoded data slices corresponding to the one or more DSN slice names.

When, at step 110, the device determines to use the standard DSN data accessing protocol, the method continues at step 124 where the device generates a set of data access requests regarding the data, which includes DSN slice name(s) and the data access function. Note that the DSN slice name(s) provide DSN address(es) for the storage unit. The method continues at step 126 where the device sends the set of data access requests to the set of storage units. The method continues at step 128 where storage units execute the data access function.

FIG. 16 is a logic diagram of an example of a sending step of a method of standard and non-standard data accessing in a DSN. With respect to each storage unit being set a request, the method includes step 130 where the device verifies one or more of a trusted certificate (e.g., a signed certificate by a trusted authority regarding the storage unit), the authentication authority (e.g., the trusted authority issues the trusted certificate), and the credential (e.g., rights to authenticate transactions, rights to communicate with other devices in the DSN, rights regarding nature of such communications, etc.). If not verified at step 132, the method continues at step 134, where the device generates an error (i.e., it identified the wrong storage unit or an invalid storage units).

When the one or more of the trusted certificate, the authentication authority, and the credential have been verified, the method continues at step 136 where the device determines to address the storage unit via one of the URL, the network port, the network interface, and the API to produce a determined access mechanism. The method continues at step 138 where the device sends the set of non-standard data access requests to at least some storage units via the determined access mechanism.

FIG. 17 is a logic diagram of an example of a converting step of a method of standard and non-standard data accessing in a DSN. The method begins at step 140 where the storage unit determines a vault identifier based on identity of a requesting device issuing a data access request. For example, the storage unit performs a look up to identify the vault. As another example, the request includes the vault ID. The method continues at step 142 where the storage unit determines a pillar number based on the vault identifier and the network identifier. For example, the storage unit knows for this vault that is stores pillar one encoded data slices. As another example, the network identifier includes an indication of the pillar number.

The method continues at step 144 where the storage unit determines a range of segment identifiers based on the data identifier. The method continues at step 146 where the storage unit determines an object identifier based on the data identifier. For example, based on the object identifier, the storage unit can look up, or otherwise determine, the number of segments associated with the data object. The method continues at step 148 where the storage unit generates one or more DSN slice names based on the pillar number, the vault identifier, the range of segment identifiers, and the object identifier. Note that the device may perform the inverse of FIG. 17 to generate a network identifier and data identifier for the non-standard DSN data access request.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
receiving, by a computing device of a dispersed storage network (DSN), a non-standard data access request regarding a set of encoded data slices, wherein a data segment of data is dispersed storage error encoded into the of encoded data slices, wherein the set of encoded data slices are stored in a set of storage units of the DSN, and wherein the non-standard data access request includes a set of network identifiers of the set of storage units, a data identifier corresponding to the data, and a data access function;

converting, by the computing device, the non-standard data access request into one or more DSN slice names;

determining, by the computing device, whether the one or more DSN slice names are within a slice name range allocated to the computing device; and when the one or more DSN slice names are within the slice name range, executing, by the computing device, the data access function regarding one or more encoded data slices corresponding to the one or more DSN slice names.

2. The method of claim 1 further comprises:
a network identifier of the set of network identifiers including, for a storage unit of the set of storage units, one or more of: a uniform record locator (URL), a network port, a network interface, an application program interface (API), a trusted certificate, an authentication authority, and a credential;
the data identifier including one or more of: a file name, a name embedded in the URL, one or more data object names, one or more data segment names, a name for the data, a name for a collection of data; and
the data access function including one or more of: a read request, a write request, a delete request, and a list request.

3. The method of claim 1, wherein the data identifier is generated to optimize a particular DSN function, wherein the particular DSN function includes one or more of: locating related encoded data slices, listing related encoded data slices, and listing of translated names regarding encoded data slices.

4. The method of claim 1, wherein the converting the non-standard data access request into one or more DSN slice names comprises:
determining a vault identifier based on identity of a requesting device issuing a data access request;
determining a pillar number based on the vault identifier and the network identifier;
determining a range of segment identifiers based on the data identifier;
determining an object identifier based on the data identifier; and
generating the one or more DSN slice names based on the pillar number, the vault identifier, the range of segment identifiers, and the object identifier.

5. The method of claim 1 further comprises:
determining a data access request is the non-standard data access request by interpreting the data access request to be using a non-standard DSN data accessing protocol.

6. The method of claim 5, wherein the interpreting includes one or more of:
determining the data access request includes the set of network identifiers;
determining the data access request includes a data identifier corresponding to the data; and
receiving a command.

7. The method of claim 1, wherein the receiving the non-standard data access request further comprises:
receiving the non-standard data access request through a non-standard DSN interface of the computing device.

8. A computing device of a dispersed storage network (DSN) comprises:
a memory;
an interface;
a processing module, wherein the processing module is operably coupled to the memory and the interface, and wherein the processing module is operable to:
receive, via the interface, a non-standard data access request regarding a set of encoded data slices, wherein a data segment of data is dispersed storage error encoded into the of encoded data slices, wherein the set of encoded data slices are stored in a set of storage units of the DSN, and wherein the non-standard data access request includes a set of network identifiers of the set of storage units, a data identifier corresponding to the data, and a data access function;
convert the non-standard data access request into one or more DSN slice names;
determine whether the one or more DSN slice names are within a slice name range allocated to the computing device; and
when the one or more DSN slice names are within the slice name range, execute the data access function regarding one or more encoded data slices corresponding to the one or more DSN slice names.

9. The computing device of claim 8 further comprises:
a network identifier of the set of network identifiers including, for a storage unit of the set of storage units, one or more of: a uniform record locator (URL), a network port, a network interface, an application program interface (API), a trusted certificate, an authentication authority, and a credential;
the data identifier including one or more of: a file name, a name embedded in the URL, one or more data object names, one or more data segment names, a name for the data, a name for a collection of data; and
the data access function including one or more of: a read request, a write request, a delete request, and a list request.

10. The computing device of claim 8, wherein the data identifier is generated to optimize a particular DSN function, wherein the particular DSN function includes one or more of: locating related encoded data slices, listing related encoded data slices, and listing of translated names regarding encoded data slices.

11. The computing device of claim 8, wherein the processing module is operable to convert the non-standard data access request into one or more DSN slice names by:
determining a vault identifier based on identity of a requesting device issuing a data access request;
determining a pillar number based on the vault identifier and the network identifier;
determining a range of segment identifiers based on the data identifier;
determining an object identifier based on the data identifier; and
generating the one or more DSN slice names based on the pillar number, the vault identifier, the range of segment identifiers, and the object identifier.

12. The computing device of claim 8, wherein the processing module is further operable to:
determine a data access request is the non-standard data access request by interpreting the data access request to be using a non-standard DSN data accessing protocol.

13. The computing device of claim 12, wherein the processing module is operable to perform the interpreting by one or more of:

determining the data access request includes the set of network identifiers;

determining the data access request includes a data identifier corresponding to the data; and receiving, via the interface, a command.

14. The computing device of claim 8, wherein the interface includes one or more of:

a standard DSN interface; and a non-standard DSN interface.

15. The computing device of claim 14, wherein the processing module is operable to receive the non-standard data access request via the non-standard DSN interface.

* * * * *